United States Patent [19]

Hsueh

[11] Patent Number: 4,719,972
[45] Date of Patent: Jan. 19, 1988

[54] TREATMENT OF STEAM FEEDWATER WITH $CO_2$ TO REDUCE OIL WELL RESERVOIR GRAVEL AND SAND DISSOLUTION DURING STEAM INJECTION

[75] Inventor: Liming Hsueh, Buena Park, Calif.

[73] Assignee: Chevron Research Company, San Francisco, Calif.

[21] Appl. No.: 728,063

[22] Filed: Apr. 29, 1985

[51] Int. Cl.$^4$ .................... E21B 43/24; E21B 47/00
[52] U.S. Cl. .................... 166/252; 166/272; 166/303
[58] Field of Search ............ 166/250, 252, 272, 303; 299/4, 5; 210/743; 75/1 R, 101 R; 208/11 LE, 428

[56] References Cited

U.S. PATENT DOCUMENTS

| 3,438,443 | 4/1969 | Prats et al. | 166/303 |
|---|---|---|---|
| 3,714,985 | 2/1973 | Bayless | 166/303 |
| 3,721,707 | 3/1973 | Straus et al. | 166/303 X |
| 4,058,587 | 11/1977 | Nelson | 75/101 R X |
| 4,217,956 | 8/1980 | Goss et al. | 166/272 |
| 4,282,929 | 8/1981 | Krajicek | 166/303 |
| 4,323,124 | 4/1982 | Swan | 166/303 |
| 4,398,604 | 8/1983 | Krajicek et al. | 166/303 |
| 4,458,759 | 7/1984 | Isaacs et al. | 166/303 X |
| 4,475,595 | 10/1984 | Watkins et al. | 166/303 |
| 4,516,636 | 5/1985 | Doscher | 166/272 |

FOREIGN PATENT DOCUMENTS 2525002 12/1976 Fed. Rep. of Germany ...... 210/743

Primary Examiner—George A. Suchfield
Attorney, Agent, or Firm—S. R. LaPaglia; Edward J. Keeling

[57] ABSTRACT

A method of inhibiting the dissolution of the gravel pack and/or the erosion of silicate-containing formations subjected to steam-enhanced oil recovery processes. The method includes the addition of $CO_2$ into the residual liquid phase of the steam, prior to injection down the well bore, to reduce the pH to form about pH 5 to about pH 9.

7 Claims, No Drawings

TREATMENT OF STEAM FEEDWATER WITH CO$_2$ TO REDUCE OIL WELL RESERVOIR GRAVEL AND SAND DISSOLUTION DURING STEAM INJECTION

The present invention relates to a method for inhibiting rock dissolution, such as gravel pack and formation sandstone dissolution, during steam injection. More particularly, the invention relates to a method for preserving the reservoir rock or gravel packing in oil wells being subjected to steam enhanced oil recovery techniques.

BACKGROUND OF THE INVENTION

In the production of crude oil from wells, steam injection has been used to recover immobile heavy oils and to enhance the oil recovery from older wells where the natural field pressures are too low for unassisted production.

Steam stimulation and steam flooding are techniques generally used in reservoirs of high-viscosity oil. The techniques involve injection into the well of a high temperature steam (approximately 250° C. or greater) in cycles of thousands of cubic meters at a time. The quality of this steam generally ranges from 60-80%, meaning that large quantities of liquid water, i.e. 40%-20% are concurrently injected into the well bore with the steam.

A typical oil well consists of a casing which lines the inside surface of the well bore and a length of tubing which extends downwardly through the casing. The casing serves to protect the tubing in the event of damage to the latter. Sucker rods extend through the tubing and terminate in a pump which reciprocates in the tubing and forces the oil upwardly therethrough. The lower end of the tubing extends into the oil zone and has perforations therein through which the oil flows thereinto.

Many wells which are subjected to steam stimulation have the lower end of the tubing filled with a gravel pack. A liner is positioned on top of the gravel pack and serves as a seat for the oil pump. The function of the gravel pack is to filter and prevent sand from being produced with the well fluid. The sand is erosive and if not filtered, would damage the pump. The gravel used to pack the well consists of granular sand grains. This material is principally quartz or silica.

Silica has a very low solubility in water at neutral pH and low temperatures, but this solubility rises sharply as temperature and pH are increased. For pH values above 11.0 and temperatures above 177° C., the dissolution rates are orders of magnitude higher than at neutral/ambient conditions.

When groundwater or river or lake water are used in a steam generator to generate steam, the gaseous phase, i.e., steam, and the residual fluid phase, i.e., water, have opposite pH's but similar undesirable reaction characteristics with the reservoir rocks. The residual liquid water produced in a steam generator generally has a pH in excess of 11.0. The steam, when condensed, has an acidic pH of about 4.0-4.5. This partitioning is due to the contained bicarbonate HCO$_3$—) in the source water which decomposes into CO$_2$ and enters the steam phase leaving the residual fluid deficient in anionic components and thus produces a pH rise proportional to the lost anionic carbonate species.

Coupled with the high liquid and steam temperatures, the fluid and steam are capable of rapidly dissolving the gravel pack or reservoir rocks, such as sandstone, quartz, diatomite, porcellanite, and the like. In the event of failure of the gravel pack, the well begins to produce sand with the eventual shut-down of the well. Alternatively, the formation collapses and the permeability is reduced.

Not only is the rate of silica dissolution quite rapid, but the water in the well becomes saturated within a short distance from the point at which the fluid contacts the surface of the silica. This is significant in that the dissolution of silica tends to be localized rather than diffused over a wide area of the zone, resulting in the face of the zone receding significantly.

In addition to the dissolution of the gravel pack due to the large quantities of water injected, there is a danger of the face of the formation also being eroded. If this occurs to a sizable extent, formation caves in and even tubing or casing collapse could result, resulting in the loss of the well.

Still further, these large silica or carbonate losses at the well bore may precipitate out as the fluid reaches supersaturated conditions as it passes through the zone. The precipitation of the silica or carbonate in the zone may result in loss of zone permeability and a resultant shut-in.

The costs resulting from such well failures are imposing. Recently, one large oil producer estimated a well failure rate of 34% due to failure of gravel packing or formation zone related problems due to steaming. The approximate cost of reworking a well presently runs over 35,000. Reducing the cycle by even one day would realize significant savings.

Dissolution of the gravel pack has been shown to be primarily a function of the pH and temperature of the injected liquid-phase water. Consequently, prior attempts at solution of the problem have focused on these aspects. For example, by keeping the pH of the injected hot water below 9.5, gravel pack dissolution can be decreased sharply. This may be accomplished by (1) selection of feed waters having low HCO$_3$-ion concentrations (>10 mg HCO$_3$—/L), (2) treating the feed water with HCl to yield the desired effluent pH, (3) using a total deionizer to remove both cations and anions from the feed water, or (4) protectively coating the gravel and/or reservoir rocks.

With regard to the first proposed solution, selection of feed waters is often impractical as the large quantities of water used are not available from a choice of sources. With regard to the second proposed solution, the use of HCl to neutralize the bicarbonate alkalinity suffers from considerations of cost as well as feasibility of the method. That is, addition of too much acid will cause severe corrosion of the steam generator and too little will result in insufficient depression of the pH to alleviate silica loss. With regard to the third proposed solution, the cost of a total deionizer is prohibitive, both in terms of capital costs as well as operating costs. With regard to the fourth proposed solution, complete coating of the gravel with a material, such as soybean lecithin described in U.S. Pat. No. 4,323,124, is not assured and driving the material out into the reservoir toward the production is impractical. Furthermore, the '124 patent does not address the problems of formation dissolution out in the formation away from the well bore.

U.S. Pat. No. 3,438,443 discloses another approach for a solution to the problem through the use of alkali metal silicates to saturate the water phase with silica and thus, hopefully, preventing the dissolution of siliceous formation material. However, alkali metal silicates are costly and the process also requires careful pH control.

Still other oil recovery processes as described in U.S. Pat. Nos. 3,500,931; 4,222,439; and 4,223,731 utilize chemicals, such as ammonium hydroxide, ammonium bisulfite, ammonium sulfite in separate injection steps to enhance oil recovery. However, these processes utilize the chemicals in a separate step, generally not including steam, and do not recognize the problems associated with the pH partitioning between the steam phase and the residual water phase. Still another oil recovery process described in U.S. Pat. No. 4,441,555 utilizes a carbonated water flooding step before a steam drive to enhance the recovery of viscous oil. This process also does not recognize the problems of pH partitioning during steam drives.

Recently, U.S. application Ser. No. 654,331, filed Sept. 9, 1984, solved the problem by adding various compounds such as ammonium salts to the steam injection feed water. Although viable, the salts may interfere with the use of surfactants. In addition, situations occur where the use of a gas medium to solve this problem may be preferable.

Thus, it would be highly desirable to have a gaseous process of reducing the pH of the residual fluid without adversely affecting the pH of the steam phase in a steam-enhanced oil recovery process. A further optional and beneficial advantage would be to have the process compatible with steam-surfactant enhanced oil recovery processes. Achieving these results would have other additional desirable benefits which would be obvious to the ordinary skilled artisan, such as use for in situ solution mining and the like.

SUMMARY OF THE INVENTION

The dissolution of silica from the gravel pack as well as the well bore area and the formation is caused by a chemical reaction between silica and water which is catalyzed by heat and alkalinity and/or acidity. According to the present invention, this dissolution is inhibited and the other desirable features recited previously are achieved by injecting $CO_2$ gas into the residual liquid phase of the steam and to reduce the pH increase caused by the decomposition of the carbonate ions in the feed water upon heating to form steam. In addition to steam drive enhanced oil recovery processes, the invention can be used with steam dump/heap leaching operations in mining and for steam in situ mineral mining.

DETAILED DESCRIPTION OF THE INVENTION

The problems of gravel and silicate formation dissolution are a function of the pH of the steam generator feed water and its total carbonate species concentration. Total carbonate species include $H_2CO_3$, $HCO_3^-$, and $CO_3^=$. For example, the decomposition of the bicarbonate ion upon heating proceeds according to the formula:

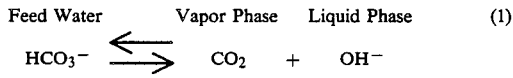

Feed Water ⇌ Vapor Phase + Liquid Phase    (1)
$HCO_3^-$ ⇌ $CO_2$ + $OH^-$

This causes the pH of the steam vapor phase to drop and the pH of the residual liquid phase to increase. It is the alkaline residual liquid phase that causes the majority of the gravel and formation dissolution.

During steam injection, the acidic steam vapor phase typically enters the upper part of the production interval while the alkaline liquid residual fluid phase enters the lower part of the production internal. However, regardless of where the vapor or liquid phases enters the production internal, the pH partitioning causes gravel pack and formation dissolution and increase overall maintenance costs.

The alkaline residual phase problem is simply and effectively addressed through the addition of $CO_2$ gas to the residual fluid phase to drive the equilibrium of the reaction to the left and thus to decrease pH of this phase prior to injection down the well bore. The amount of injected $CO_2$ depends on the pH of the residual liquid. If the pH is too alkaline, then more $CO_2$ is added. If the pH is too low, then less $CO_2$ is added. The pH should be adjusted to from about pH 5 to about pH 9 and preferably from about pH 7 to about pH 8.

More specifically, after the steam is formed, the pH of a portion of the residual fluid phase is measured and a flow of $CO_2$ gas is injected therein to lower the pH to the desired range. Thereafter, the pH of a portion of the residual fluid downstream from the $CO_2$ injection is measured. If the pH is too high, then more $CO_2$ is injected upstream. If the pH is too low, then the flow of $CO_2$ upstream is reduced.

As an example, bubbling 80 cc's of $CO_2$ per cc of $H_2O$ through the residual fluid phase of a synthetic feed water, which had 0.004M $NaHCO_3$, 0.004M NaCl, and 0.001 M $MgSO_4$, caused the pH of the residual fluid phase to drop from about 11.1-11.4 to about 5.6-6.0.

A typical $CO_2$ flow rate is from about 10 to about 1000 standard cubic feet per barrel of cold water equivalent of injected steam and preferably between about 400 to about 600 standard cubic feet/barrel of cold water equivalent of injected steam. A standard cubic foot is measured at 60° F. and 1 atmosphere pressure, i.e., at 15.5° C. and 760 mm Hg.

For a typical 350-barrel per day (BPD) steam injection project with a bicarbonate concentration of 250 ppm $HCO_3^-$, the daily $CO_2$ consumption is about 140,000 standard cubic feet. The cost of the $CO_2$ varies upon its availability. However, this causes about a 20-fold decrease in the silica dissolution rate at an adjusted pH of about 8.

The process is suitable for use within cyclic steam injection or patterned steam flood, i.e., four-spot, five-spot, nine-spot, their invented forms and the like. In addition, it can be used with surfactants and steamfoam drives. Suitable surfactants are known anionic, cationic or nonionic surfactants. Preferred surfactants for steamfoam enhanced oil recovery drives are known as alpha olefin sulfonates and their dimers. These compositions are described in U.S. Pat. No. 3,721,707 and incorporated herein by reference. Furthermore, the steam drive does not have to be continuous so long as the displacing medium does not substantially alter the preferred pH range of the residual liquid phase of the steam in the formation.

The process has been described with respect to particularly preferred embodiments. Modifications which would be obvious or apparent to the ordinary skilled artisan are contemplated to be within the scope of the invention. For example, the invention is suitable to reduce the silicate dissolution of not only sand or gravel but siliceous formations, such as diatomite, procellanite and quartz.

What is claimed is:

1. A process of inhibiting the dissolution of the gravel pack and/or silicate containing hydrocarbon-bearing formation subjected to steam enhanced oil recovery stimulation comprising:
    creating steam, said steam comprises a vapor phase and a residual liquid phase;
    monitoring the pH of said residual liquid phase;
    injecting a sufficient amount of $CO_2$ gas into the residual liquid phase of the steam to reduce the pH of the residual liquid phase to from about pH 5 to about pH 9, and
    injecting said steam into said formation, wherein the reduced pH of the steam inhibits the dissolution of the gravel pack and/or silicate containing hydrocarbon-bearing formation.

2. The process according to claim 1 wherein the flow of $CO_2$ is from about 10 to about 1000 standard cubic feet of $CO_2$ per barrel of cold water equivalent of injected steam.

3. The process according to claim 2 wherein the flow rate is from about 400 to about 600 standard cubic feet of $CO_2$ per barrel of cold water equivalent of injected steam.

4. The process according to claim 2 which further comprises adding a surfactant selected from the group consisting of anionic surfactant, cationic surfactant, nonionic surfactant, and mixtures thereof, to the injected steam.

5. The process according to claim 4 wherein the steam injection is selected from the group consisting of cyclic steam injection, patterned steam flood, and mixtures thereof.

6. In a process for the recovery of hydrocarbons from a silicate containing hydrocarbon formation penetrated by at least one steam injection well and at least one production well spaced therefrom, the process which comprises:
    creating steam, said steam comprises a vapor phase and a residual liquid phase;
    monitoring the pH of the residual liquid phase of the steam;
    injecting $CO_2$ gas into said residual liquid phase at a rate of from about 10 to about 1000 standard cubic feet of $CO_2$ per barrel of cold water equivalent of steam so as to reduce the pH of the residual liquid phase to from about pH 7 to about pH 8;
    driving said steam from said injection well into said formation and away from said injection well to assist the movement of hydrocarbons toward said production well; and
    recovering the hydrocarbons at said production well.

7. The process according to claim 6, which further comprises adding a surfactant selected from the group consisting of anionic, cationic and nonionic surfactants to the injected steam.

* * * * *